(12) United States Patent
Fairlie et al.

(10) Patent No.: US 6,912,450 B2
(45) Date of Patent: Jun. 28, 2005

(54) ENERGY DISTRIBUTION NETWORK

(75) Inventors: Matthew J. Fairlie, Toronto (CA);
William J. Stewart, Toronto, CA (US);
Andrew T. B. Stuart, Toronto (CA);
Steven J. Thorpe, Toronto (CA);
Charlie Dong, Toronto (CA)

(73) Assignee: Stuart Energy Systems Corp., Ontario (CA)

( * ) Notice: Subject to any disclaimer, the term of this patent is extended or adjusted under 35 U.S.C. 154(b) by 0 days.

(21) Appl. No.: 10/829,435

(22) Filed: Apr. 22, 2004

(65) Prior Publication Data

US 2004/0199295 A1 Oct. 7, 2004

Related U.S. Application Data

(62) Division of application No. 09/387,828, filed on Sep. 1, 1999, now Pat. No. 6,745,105.

(30) Foreign Application Priority Data

May 12, 1999 (CA) .............................. 2271448

(51) Int. Cl.[7] .............................................. G05B 21/00
(52) U.S. Cl. ...................... 700/273; 700/266; 205/343; 205/637
(58) Field of Search .............................. 700/266, 271, 700/273; 210/603; 205/343, 628, 637; 48/61

(56) References Cited

U.S. PATENT DOCUMENTS

| 4,002,553 A | | 1/1977 | Arntz |
| 4,084,038 A | * | 4/1978 | Scragg et al. ................. 429/19 |
| 4,085,709 A | | 4/1978 | Tangri |
| 4,161,657 A | | 7/1979 | Shaffer, Jr. |
| 4,233,132 A | | 11/1980 | Carr et al. |
| 4,344,831 A | | 8/1982 | Weber |
| 4,436,793 A | * | 3/1984 | Adlhart ........................ 429/17 |
| 4,776,171 A | * | 10/1988 | Perry et al. ................... 60/698 |
| 4,781,029 A | | 11/1988 | SerVaas |
| 5,082,544 A | | 1/1992 | Willey et al. |
| 5,372,617 A | | 12/1994 | Kerrebrock et al. |
| 5,432,710 A | | 7/1995 | Ishimaru et al. |
| 5,512,145 A | | 4/1996 | Hollenberg |
| 5,512,787 A | | 4/1996 | Dederick |
| 5,592,028 A | | 1/1997 | Pritchard |
| 5,621,654 A | | 4/1997 | Cohen et al. |
| 5,690,797 A | | 11/1997 | Harada |
| 5,702,491 A | | 12/1997 | Long et al. |
| 5,708,424 A | | 1/1998 | Orlando et al. |
| 5,711,865 A | | 1/1998 | Caesar |
| 5,779,866 A | | 7/1998 | Tarancon |
| 5,799,624 A | | 9/1998 | Hsieh |
| 5,817,157 A | | 10/1998 | Checketts |
| 5,840,172 A | | 11/1998 | Zugravu |
| 5,899,072 A | | 5/1999 | Gode |
| 5,999,888 A | | 12/1999 | Aubee |
| 6,021,402 A | | 2/2000 | Takriti |

(Continued)

FOREIGN PATENT DOCUMENTS

DE      3804659 A1      8/1989
DE      40 20 721 A1      2/1992

(Continued)

*Primary Examiner*—Leo Picard
*Assistant Examiner*—Elliot L Frank
(74) *Attorney, Agent, or Firm*—Manelli Denison & Selter pllc; Edward J. Stemberger

(57) ABSTRACT

A hydrogen fuel supply system includes a hydrogen generator for generating hydrogen from an energy source at an outlet pressure. An outlet conduit feeds the hydrogen to a user. A controller controls the hydrogen generator to produce hydrogen at the outlet pressure. An input interface receives user demand data and activates the controller in accordance with the user demand data.

44 Claims, 9 Drawing Sheets

U.S. PATENT DOCUMENTS

| | | |
|---|---|---|
| 6,026,349 A | 2/2000 | Heneman |
| 6,057,051 A | 5/2000 | Uchida et al. |
| 6,083,637 A | 7/2000 | Walz et al. |
| 6,153,058 A | 11/2000 | Richardson, Jr. |
| 6,153,943 A | 11/2000 | Mistr, Jr. |
| 6,285,178 B1 | 9/2001 | Ball et al. |
| 6,285,964 B1 | 9/2001 | Babel et al. |
| 6,294,276 B1 | 9/2001 | Ogino |
| 6,311,105 B1 | 10/2001 | Budike, Jr. |
| 6,366,889 B1 | 4/2002 | Zaloom |

FOREIGN PATENT DOCUMENTS

| | | |
|---|---|---|
| DE | 19612776 A1 | 10/1997 |
| EP | 0 905 498 A1 | 3/1999 |
| GB | 2143848 A | 2/1965 |
| JP | 51-48818 | 4/1976 |
| JP | 01200052 A | 8/1989 |
| JP | 07-101316 | 4/1995 |
| JP | 08-260176 | 10/1996 |
| JP | 10-299576 | 11/1998 |

* cited by examiner

ENERGY DISTRIBUTION NETWORK

This is a division of application Ser. No. 09/387,828, filed on Sep. 1, 1999, now U.S. Pat. No. 6,745,105.

FIELD OF THE INVENTION

This invention relates to an energy network for providing hydrogen-generated at a production site, particularly by one or more water electrolysers, for use particularly, as a fuel for vehicles or energy storage. The invention further relates to the use of hydrogen as a fuel for a fuel cell wherein hydrogen is converted into electrical energy, for combustion as an auxiliary energy source and for the generation of electricity, particularly, as part of an electrical distribution system.

BACKGROUND TO THE INVENTION

In planning the production capacity of a large chemical plant, for example, for methanol production or a large electricity production site, correct knowledge of expected demand of the product is critical with regard to the optimization of capital deployment and certainty of a return on investment in the large facility. Most often millions of dollars are required to finance the construction. Thus, measuring and predicting the supply and demand for the end product is highly desirable. Applying techniques to predict future demand on a real time, short, medium or long term basis, commercially, is extremely important, particularly for maximizing asset utilization, reducing inventory, and minimizing risk.

Currently, the widespread deployment of a network of hydrogen supply systems for hydrogen-fueled vehicles does not exist. At present, there is a widespread network of hydrocarbon-fueled vehicles complete with an optimized fuel supply infrastructure network based on the limits of known technology, society's standards and consumer acceptance. Many believe to put a widespread, geographic network of hydrogen vehicles with a network of hydrogen supply encompassing production, storage, transportation and delivery would involve such a large investment and be so challenging, that the task is believed essentially impossible to do in any economic method. Although, there are numerous examples of hydrogen production from electricity close to where it can be used to fuel a vehicle, such individual sites are not interconnected so as to optimize performance and asset deployment.

There are a number of shortcomings of the current hydrocarbon-fueled vehicle distribution networks, which shortcomings include a finite resource of the hydrocarbon fuel per se and an uneven distribution of the world's resources. In fact, much of the world's hydrocarbon resources are focused in just a few geographical areas, such that many nations do not have a substantive supply of indigenous fuel. This has led to global and regional conflict. In addition, there is uncertainty about the impact of greenhouse gas emissions on health and climate change. Furthermore, the very use of hydrocarbon fuels, or the processing for use of hydrocarbon fuels, leads to ground level pollution of smog and ozone as well as regional environmental challenges, such as acid rain. Airborne pollutants, either directly or indirectly formed due to the combustion or processing of hydrocarbon fuels, lead to reduced crop output, potentially reduced lifespan and other health issues for all living beings.

A network of fuel supply systems which could provide as good, if not better, consumer service and reduce or eliminate fuel resource disparity, negative environmental aspects of hydrocarbon fuels and their combustion or processing which can be introduced in a manner which mitigates the investment risk, optimizes the capacity factor of all equipment in the system and encourages the use of non-carbon energy sources is highly desirable. Hydrogen fuel, produced from energy sources which are lower in carbon content than conventional coal and oil, or hydrogen fuel produced from coal and oil in which the carbon is sequestered below the surface of the earth, would be an ideal fuel for this network.

One aspect of the delivery of a product from a production site to a utilization site involves the use of storage. Storage of the product, sometimes a commodity, can efficiently allow for supply and demand to meet in a manner which optimizes the utilization of production. Two examples of this is the supply of hydrogen produced (a) from methanol on board a vehicle and used in a car, where on board it is reformed into a hydrogen containing gas; and (b) by electricity off-board a vehicle and used to fill a compressed gas storage tank either on the vehicle or on the ground for subsequent transfer to the vehicle.

In latter case (b), the hydrogen is produced off-board the vehicle and is stored in a compressed gas tank, or similar container. The accumulation of hydrogen disconnects the production of electricity for hydrogen production with the real-time demand for hydrogen. This load shifting effect on electricity production, enabled by storage of hydrogen, enables better and more predictable utilization of electricity—particularly when the hydrogen demand is of some significant percentage, say 1% to 100% with regard to the electricity being produced. This enables decisions to be made on a real time basis as to where to direct the electricity, for example, to hydrogen production by electrolysis or other uses. This is only part of the equation as it enables measurement of the supply of electricity, i.e. at times where incremental production of electricity is available or advantageous and includes many aspects of operating an electrical generator, transmission, and distribution system which creates improved asset utilization for hydrogen production in addition to meeting immediate real time electrical demand. The second half of the equation is the measurement of hydrogen demand in essentially real time. This involves planning for the production of hydrogen. When the hydrogen production is from electrolysis sources and the hydrogen is transferred to the storage tank on board the vehicle from a storage tank or directly from an electrolyser base to meet the need demanded by the market place for hydrogen, measurement on a moment by moment basis is possible of the hydrogen demand. The demand can be understood by those familiar in the art by techniques such as temperature/pressure measurements as well as electrical energy consumption. In addition, measurement of the amount of hydrogen energy on board the vehicle can enable information to be provided to the controller for hydrogen supply from electricity production and can be equated to stored energy/electrical resources. These measurements complete the equation for supply and demand with detailed measurement. This enables the following:

(a) real time predictions of the amount of electricity required in the following time periods: instantaneous and, when combined with previous data, the rate of growth of demand for electricity for hydrogen production;

(b) the deferred use of electricity for hydrogen production and the supply of electricity to a demand of a higher priority (economic or technical);

(c) the safe curtailment of electricity supply for the use of hydrogen production as sufficient storage exists in the 'system network' of storage tanks; and (d) the ability to develop 'virtual' storage reservoirs whereby priority/cost/manner of supply of electricity can be determined based on the status of the storage reservoir.

A system which connects electricity production decision making to stored hydrogen, either on board a vehicle or on the ground to hydrogen markets enables better decision making with regard to when, where, and how much electricity to provide. This information, available on essentially an instantaneous basis through measurement, is critical to asset deployment and increase asset utilization and risk mitigation. It can also be used to better schedule electrical generators. By acting as an "interruptible load" it can provide operating reserves for the electrical utility to meet reliability requirements. By collecting this information through appropriate means a novel and inventive measurement system is created which incorporate the features incorporating one or more of a,b,c and d above.

It can, thus, be seen that the decisions concerning a chemical plant for, say, methanol production which then is used for many applications including on-board or off-board reforming of methanol can not provide instantaneous and daily information to influence production decisions.

It is thus an object of the present invention to provide an energy distribution network incorporating hydrogen which provides for effective deployment and utilization of electrical generation, transmission and distribution capacity and enhanced economic performance of such assets.

SUMMARY OF THE INVENTION

The invention in its general aspect embodies a network having:
(a) primary energy sources transmitted from their production sources to a hydrogen production site;
(b) hydrogen production and delivery equipment with or without by-product sequestration equipment, with or without on-ground hydrogen storage equipment; and
(c) collection, storage and supply controllers for the communication of data.

The term controller comprises central processing means and computing means for receiving, treating, forwarding and, optionally, storing data.

The practice of the invention involves use of algorithmic manipulations within the controller(s) to utilize and determine information data relating to, inter alia, the amount of hydrogen required from an electrolyser(s) by the user(s), the time of delivery of electrical energy to the electrolyser, duration of period the energy is to be delivered to the electrolyser(s), the energy level to be sent to the electrolyser(s), the hydrogen pressure of the user storage, real time price of electricity and price forecast, rate of energy level or the type of modulation of the energy resource(s) to the electrolyser(s); and the types of electrical energy selected from fossil fuels, hydro, nuclear, solar and wind generated.

The algorithmic manipulations within the controller(s) further determine the control stages operative in the practice of the invention, such as, inter alia, the operation of the energy resources(s), electrolytic cell(s), compressor valves, user activation units, and the like as hereafter described.

By combining the above elements together, a network that measures real-time and computed expected demand for hydrogen fuel and provides product hydrogen accordingly is realized. This network may be linked with standard projection models to predict future demand requirements by geographic location. A preferred feature of this hydrogen network is that it does not rely on the construction of large scale hydrogen production facilities of any kind. Instead, preferred hydrogen production facilities provided herein are as small as technically/commercially feasible and include scaled-down apparatus to meet the needs of a single consumer or a plurality of customers from a single commercial, retail or industrial site.

Accordingly, in its broadest aspect, the invention provides an energy distribution network for providing hydrogen fuel to a user comprising: hydrogen fuel production means; raw material supply means to said production means; hydrogen fuel user means; and information and supply control means linked to said production means, said raw material supply means and user means.

The term 'hydrogen fuel user means' in this specification means a recipient for the hydrogen produced by the hydrogen production means. It includes, for example, but is not limited thereto: hydrogen storage facilities—which may be above or below ground, in a vehicle and other transportation units; direct and indirect hydrogen consuming conversion apparatus and equipment, such as fuel cell, electrical and thermal generating apparatus; and conduits, compressors and like transmission apparatus. The demand may also be initiated by the energy supply, which may need to "dump" power and thus offer an opportunity to produce cheaper hydrogen.

The raw material(s) may include, for example, natural gas, a liquid hydrocarbon or, in the case of an electrolyser, electrical current and water.

With reference to the practice of the invention relating to natural gas, natural gas from a remote field, is put in a pipeline and transported to a retail outlet or fuel supply location for a hydrogen fuel. At or near the retail outlet or fuel supply location, the natural gas is steam/methane reformed with purification to produce hydrogen gas. The carbon dioxide by-product is vented or handled in another manner that leads to its sequestration. The hydrogen produced may be fed, for example, into a vehicle's compressed hydrogen gas storage tank through use of compression. Alternatively, the compressor may divert the flow to a storage tank, nominally on the ground near the steam methane reformer/compressor system. The amount of hydrogen produced in a given day is determined in many ways familiar in the art and includes natural gas consumption, hydrogen production, storage pressure, rate of change, and the like. This information is electronically or otherwise transferred to the operator of the network according to the invention. This information over time constitutes demand information for hydrogen from which supply requirements can be foreseen as well as future demand predicted. As the demand for hydrogen grows, the network operator may install a larger natural gas reformer or add more storage tanks to make better use of the existing generator when demand is low. The ability to measure and store hydrogen, enables better decisions to be made than with the current liquid hydrocarbon (gasoline) infrastructure. The measuring ability enables predictions for the raw material (natural gas in this case) to be determined. If the natural gas comes from a pipeline, the supply/demand characteristics provides useful information on how to better manage the pipeline of natural gas as well as plan for purchases expansion, trunk extensions, maintenance, amortization of capital assets, and even discoveries of natural gas. The measuring ability of the system also provides key information on predictions for vehicle demand as the growth rate of hydrogen demand for vehicle use may be a significant leading indicator.

With reference to a network according to the invention based on the current popular fuels, gasoline and diesel, produced from a network of oil wells, and refineries, this fuel is shipped to a retail outlet or fuel supply location. As needed, the gasoline/diesel is reformed or partially oxidized, or other chemical steps taken to produce hydrogen. After sufficient purification, the hydrogen is either stored directly on to the vehicle or at off-vehicle storage sites for latter on-vehicle transfer. The amount of hydrogen produced in a given day is determined by those knowledgeable in the art based on gasoline/diesel consumption, hydrogen production, storage levels or pressures of gas storage, rates of change, and the like. This information is electronically or otherwise transferred to the operator of the network according to the invention. This information over time constitutes demand information for hydrogen from which supply requirements are foreseen as well as future demand predicted. As the demand for hydrogen grows, the network operator may install a larger gasoline/diesel reformer or add more storage tanks to make better use of the existing generator when demand is low. The ability to measure and store hydrogen, enables better decisions to be made with regard to deployment of assets, such as storage tanks and more hydrogen production equipment, than with the current liquid hydrocarbon (gasoline/diesel) infrastructure. The measuring ability enables predictions for the raw material to be determined. This is particularly important if the gasoline/diesel is specifically produced for low pollution or zero emission vehicles in regards to octane, additives, detergents, sulphur content, and the like and there is a unique capital structure to the assets used to produce, transport and distribute this special grade of gasoline/diesel. The measuring ability of the system according to the invention also provides key information on predictions for vehicle demand as the growth rate of hydrogen demand for vehicle use is a very significant leading indicator.

With reference to a network according to the invention based on a liquid hydrocarbon, such as methanol, methanol produced from a network of generating plants spread locally or globally, is shipped to a retail outlet or fuel supply station location. As needed, the methanol is reformed, partially oxidized, or other chemical steps taken to produce hydrogen. After sufficient purification, the hydrogen may be stored directly on to the vehicle or non-vehicle storage for later vehicle transfer. The amount of hydrogen produced in a given day could be determined as described hereinabove with reference to natural gas and gasoline.

However, a most preferred network is based on using electricity for water electrolysis. Electricity travelling in a conductor, produced from a network of generating plants spread locally or globally, is fed to a residence, home and the like, a commercial or industrial retail outlet or other fuel supply location. As needed, the electricity is used in an electrolysis process that produces hydrogen and oxygen that is of value. After sufficient purification and compression if required, the hydrogen may be stored directly on to a vehicle or fed to non-vehicle storage.

Electricity can come from many different types of primary energies, each with their own characteristics and optimal ways and means of production. Once electricity is produced, it is difficult to store effectively and must be transmitted through some form of distribution/transmission system. Such systems must respond to many different circumstances of users, multiple users more so than from a natural gas pipeline, time of use variation, load density, primary electrical input source, status of primary electrical input source, weather conditions, unique aspects of dealing with the nature of electricity, versus a gas or a liquid.

An electrolysis unit, particularly an appropriately designed water electrolysis system, has unique advantages in how it can be connected to electricity supplies and does not have to operate continuously. An electrolyser can be made to start, stop or modulate in partial load steps more readily than the typical methods to produce hydrogen from hydrocarbons. This factor is a key element in that electricity may be dynamically "switched" from hydrogen production to other electrical loads based on a priority schedule. This feature enables an electrolyser to obtain lower cost electricity than higher priority electrical loads. Further, since electrolysis is a very scalable technology from 1<kW to over 100,000 kW, the same system, variant only in size, has the potential to be distributed, as needed. Thus, it can provide control activation for meeting changes in electrical demand dynamically.

In the practice of the present invention in a preferred embodiment, the wires that deliver the electrical energy to the electrolyser are used to communicate useful information about the state of the electrolysis process to related devices. This eliminates the need for an additional connection or a "telemetry device" to collect necessary information in an electronic fashion.

Thus, a hydrogen fuel network incorporating electricity and electrolysis offers useful opportunities with intermittent renewable energy sources, e.g. photovoltaics and wind turbines, even though these may be located hundreds of miles away from a network of electrolysis-based hydrogen generators. The hydrogen generators can be sequenced to produce hydrogen at a rate proportional to the availability of renewable energy sources. In addition, by measuring price signals, the electrolysers can be reduced or shut down if the market price for electricity from a particular generation source is beyond a tolerance level for fuel supply. The electrolysis system can also be readily shut down in the case of emergency within the electrical system. In view of the speed of data communications, control actions which can be taken in less than one second can be uses to dynamically control the grid as well as replace spinning reserves to meet reliability requirements.

Only a natural gas distribution system is close to an electricity system in the concept of a continuous trickle supply of the energy source to the hydrogen generator. When gasoline or methanol arrives at a hydrogen production and fuel supply site, it is generally by large shipment and the gasoline or methanol would be stored in a tank of some 50,000 gallons size. The trickle charge is a critical feature of the hydrogen fuel network and is clearly preferred. The distributed storage of hydrogen—either on the vehicle which itself may be trickle charged or for an on ground storage tank which can be trickle charged, accumulate sufficient hydrogen and then deliver that hydrogen to a car at a power rate measured in GW. The ability to take a kW trickle charge and convert it to a GW rapid fuel power delivery system through effective storage is a key element in building an effective fuel supply service as a product of the network.

The ability to measure hydrogen supply and demand as well as estimate the total hydrogen stored in the network, including ground storage or storage on board vehicles, provides a most useful benefit of the network of the invention. The integrated whole of the network is analogous to a giant fuel gauge and, thus, predictions of the amount of electricity required to fuel the system and the rate of fueling required can be made. This provides electricity power generators/marketers information from which they can help better predict supply and demand real time. Uniquely, the location as to where the fuel is most needed can also be determined on a near continuous basis.

In addition, distributed hydrogen storage, a consequence of the network according to the invention, is similar to distributed electricity storage or, if integrated together, a large hydroelectric storage reservoir. The hydrogen storage reservoir, may optionally, be converted back to electricity for the grid using an appropriate conversion device such as a fuel cell. Most objectives of energy management obtained with hydroelectric water reservoirs may be practiced with hydrogen reservoirs. Given the distributed network of hydrogen reservoirs, the priority of practicing a particular energy management technique can be performed. This prioritization capability is unique to the network of the invention.

As a network incorporating distributed electrolysis-based hydrogen supply systems with distributed reservoirs is developed, the planning for the addition of new electricity generation systems can be made based on information from the network. The uniqueness of knowing the supply, demand and energy storage aspects of the network provides information about the optimal specification of new electrical generating systems. The creation of large scale energy storage capability encourages selection of electrical generators previously challenged by the lack of energy storage. Such generators including wind turbines and photovoltaic panels may be encouraged. This should optimize the ability to implement these types of generators which may be mandated by governments as necessary to combat perceived environmental challenges.

The hydrogen network in the further preferred embodiments enables money payments to be made for services provided in real time as for preferred forms of energy sources based on environmental impact.

Thus, the network of energy sources of use in the practice of the invention produces hydrogen through various techniques, such as steam methane reforming, partial oxidation or water electrolysis, at, or very near, the intended user site so that no further processing beyond appropriate purification and pressurization for the specific storage tank/energy application. In the case where the hydrogen energy comes directly or indirectly from a carbon source which is deemed by society to be too high in carbon content ($CO_2$ production) or where other pollutants may exist, these are captured at source and sequestered to the extent society deems necessary. In addition, a method to measure, or reasonably estimate the flow of hydrogen into storage (compressed gas, liquid $H_2$, hydrides, etc.) in or on the ground or an appropriate storage system on board a vehicle is helpful to obtain information which can lead to decisions as to when, where and how to produce fuel as well as when to deploy more assets in the process of producing fuel or on board a vehicle measurements.

Thus, the invention in one most preferred embodiment provides a hydrogen fuel vehicle supply infrastructure which is based on a connected network of hydrogen fuel electrolysers. The electrolysers and control associated means on the network communicate current electrical demand and receive from the electrical system operator/scheduler the amount of hydrogen fuel needed to be produced and related data such as the time period for refueling. For example, based on the pressure of the storage volume and the rate at which the pressure rises, the storage volume needed to be filled can be calculated. The time period for fueling may also be communicated to the fuel scheduler, for example, by the setting of a timer on the electrolyser appliance and/or the mode of operation, e.g. to be a quick or slow fuel fill. The electrical system operator/fuel delivery scheduler may preferably aggregate the electrical loads on the network and optimize the operation of the electrical system by controlling the individual operation of fuel appliance, using 'scheduled' hydrogen production as a form of virtual storage to manage and even control the electrical system; and employ power load leveling to improve transmission and generating utilization, and dynamic control for controlling line frequency.

It is, therefore, a most preferred object of the present invention to provide a real time hydrogen based network of multiple hydrogen fuel transfer sites based on either primary energy sources which may or may not be connected in real time.

There is preferably a plurality of such electrolysers on the energy network according to the invention and/or a plurality of users per electrolysers on the system.

In a preferred aspect, the network of the invention comprises one or more hydrogen replenishment systems for providing hydrogen to a user, said systems comprising (i) an electrolytic cell for providing source hydrogen;

(ii) a compression means for providing outlet hydrogen at an outlet pressure;

(iii) means for feeding said source hydrogen to said compressor means;

(iv) means for feeding said outlet hydrogen to said user;

(v) control means for activating said cell to provide said hydrogen source when said outlet pressure fall to a selected minimum value; and (vi) user activation means for operably activating said control means.

The aforesaid replenishment system may comprise wherein said electrolytic cell comprises said compression means whereby said outlet hydrogen comprises source hydrogen and said step (iii) is constituted by said cell and, optionally, wherein a hydrogen fuel appliance apparatus comprising the system as aforesaid wherein said means (iv) comprises vehicle attachment means attachable to a vehicle to provide said outlet hydrogen as fuel to said vehicle.

The invention in a further broad aspect provides a network as hereinbefore defined further comprising energy generation means linked to the user means to provide energy from the stored hydrogen to the user.

The energy generation means is preferably one for generating electricity from the stored hydrogen for use in relatively small local area electricity distribution networks, e.g. residences, apartment complexes, commercial and industrial buildings or sites, or for feeding the auxiliary generated electrical power back into a wide area electricity distribution network, like national, state or provincial grids, on demand, when conventional electricity power supply is provided at peak periods. The energy generation means using hydrogen as a source of fuel can utilize direct energy conversion devices such as fuel cells to convert hydrogen directly to electricity, and can utilize indirect energy conversion devices such as generators/steam turbine to produce electricity, and can utilize the hydrogen directly as a combustible fuel as in residential heating/cooking etc.

Accordingly, in a further aspect, the invention provides an energy distribution network for providing hydrogen fuel to a user comprising (a) energy resource means;

(b) hydrogen production means to receive said energy from said energy resource means;

(c) hydrogen fuel user means to receive hydrogen from said hydrogen production means; and (d) data collection, storage, control and supply means linked to said energy resource means, said hydrogen production means and said hydrogen fuel user means to determine, control and supply hydrogen from said hydrogen production means;

wherein said hydrogen fuel user means comprises a plurality of geographic zones located within or associated with at least one building structure selected from the group consisting of an office, plant, factory, warehouse, shopping mall, apartment, and linked, semi-linked or detached residential dwelling wherein at least one of said geographic zones has zone data control and supply means linked to said data collection, storage, control and supply means as hereinbefore defined to said geographic zones.

The invention further provides a network as hereinbefore defined wherein each of at least two of said geographic zones has zone data control and supply means, and a building data control and supply means linked to (i) said data collection, storage, control and supply means, and (ii) each of at least two of said geographic zone data control and supply means in an interconnected network, to determine, control and supply hydrogen from said hydrogen production means to said geographic zones.

BRIEF DESCRIPTION OF THE DRAWINGS

In order that the invention may be better understood, preferred embodiments will now be described by way of example, only, wherein.

DETAILED DESCRIPTION OF A PREFERRED EMBODIMENT ACCORDING TO THE INVENTION

Figure 1:
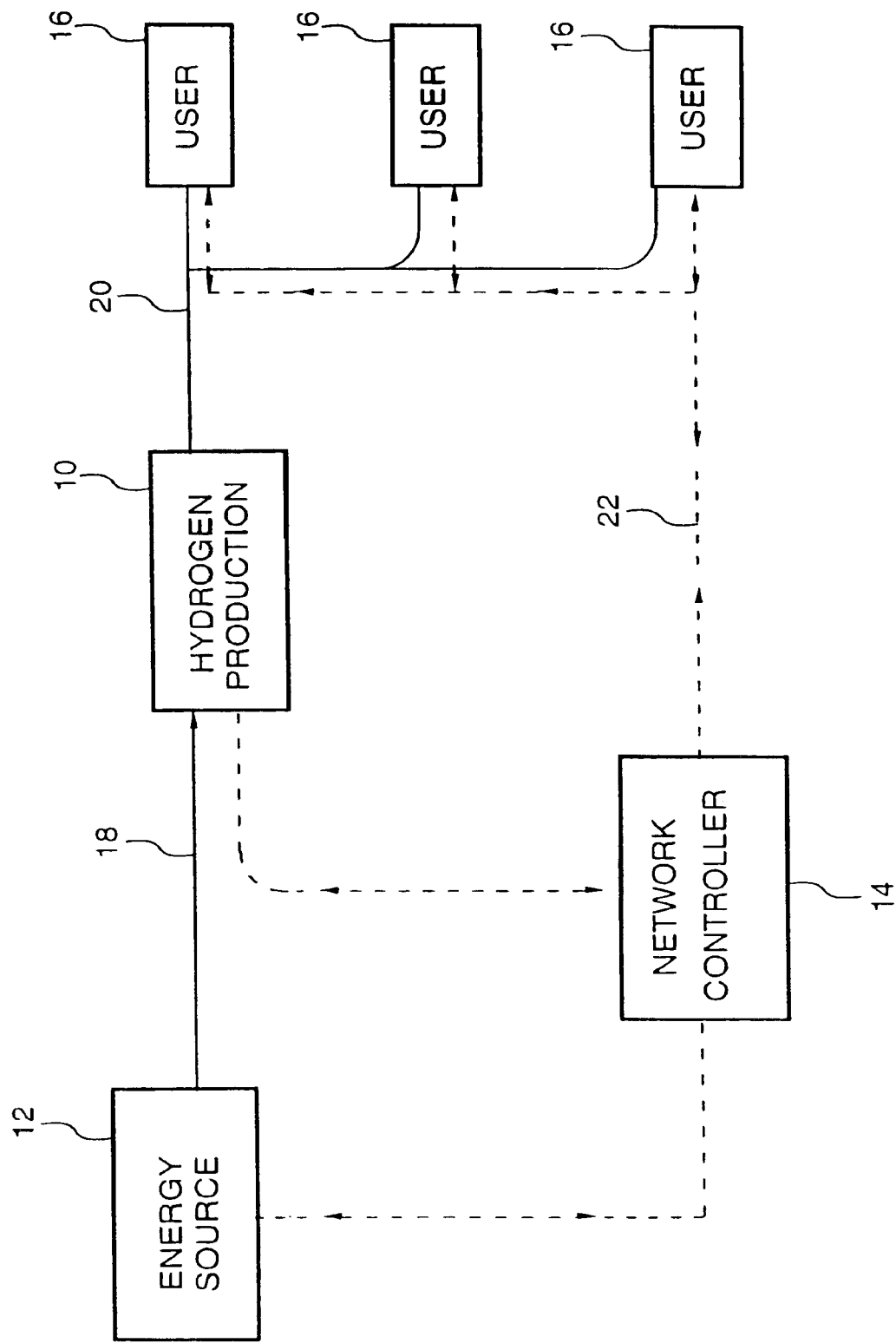
FIG. 1 is a schematic block diagram of one embodiment according to the invention.

FIG. 1 represents an embodiment providing a broad aspect of the invention having a hydrogen production source 10, supplied by energy source 12 which may be an electricity generating power plant, or a natural gas, gasoline or methanol reforming plant or combinations thereof. A control unit 14 and users 16 are suitably linked by hardware input and output distribution conduits 18, 20, respectively, and electrical data transmission lines 22.

Users 16 define demands for hydrogen transmitted by means of, for example (i) use of a credit card, (ii) use of a smart card, (iii) use of a voice activation system, (iv) manual activation via front panel control, (v) use of a electronic, electric, or wireless infrared data transmission system to register a hydrogen demand on the network. Upon receipt of the demand, controller 14 determines the natures of the demand with respect to the quantity of hydrogen requested, the time to deliver the hydrogen, the conditions under which to deliver the hydrogen with respect to the temperature, pressure, purity and the like and the rate of delivery of hydrogen requested. Such initial definition of the hydrogen demand may be performed by a single controller 14 as illustrated in this embodiment or by a plurality of controllers 14 interconnected in a network, having a configuration in the form of, for example, a backbone (FIG. 1A), hub/star (FIG. 1B), or ring (FIG. 1C) in such a way as to permit intercommunication between all the users.

Upon receiving a demand, controller 14 determines the availability of energy resources 12, to which it is interconnected, with respect to the amount of energy available, the nature of the power available, the time availability of the energy, the type of energy source available, the unit prices per increment of energy and compares this to the energy required to generate the hydrogen demanded by users 16.

Upon receipt of the demand, controller 14 further determines the status of all hydrogen producing source(s) 10 on the network. The initial checks include the current status of the hydrogen source as a % use of rated capacity, rated capacity to produce hydrogen of a known quantity, and the amount of energy consumption. The initial checks further include monitoring of the process parameters for starting the hydrogen producing source and process valve and electrical switch status.

After controller 14 determines the initial status of hydrogen producing source 10, the hydrogen demand by users 16, and the nature and availability of the energy sources 12 on the network, controller 14 then initiates the starting sequence for hydrogen producing source(s) 10 to meet the demands of users 16 subject to the availability of energy resource(s) 12 at the lowest possible cost. Controller 14 secures energy from source(s) 12 at a preferred cost to user 16 to permit hydrogen to flow through conduits 20. Energy is consumed by unit 10 in the generation of hydrogen which are supplied to users 16 along conduits 20.

Any incorrect noted status in any of the operational parameters noted above or in the quality/purity of the product gases will result in controller 14 to alter or interrupt the operation of hydrogen source 10 until an appropriate status has been reached. Controller 14 also can modulate on or off a plurality of hydrogen producing sources on the network to meet the demands of users 16 so as to successfully complete the hydrogen demand of users 16 to provide the minimum quantity of hydrogen at the minimum rate of delivery over the minimum amount of time as specified at the minimum purity at the minimum cost to the user.

Upon receiving notification from users 16 that their requirements have been successfully met, controller 14 instructs hydrogen producing source 10 to cease operation and informs energy source(s) 12 of the revised change in electrical demand.

Figure 1A:
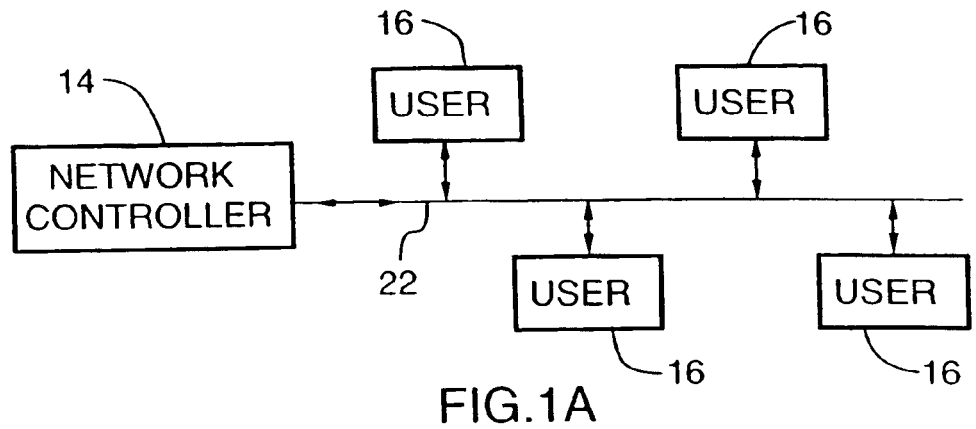
FIGS. 1A, 1B and 1C represent block diagrams of the data flow interrelationships between the users and controller network of use in alternative embodiments according to the invention.

With reference also to FIG. 1A, which illustrates the data flow relationship between a plurality of users 16 along conduit 22 linking hydrogen production means 10 users 16 and to energy source 12 under the direction of controller 14. FIG. 1A defines a "backbone" for the communication of data from controller 14 to each of said users 16.

Figure 1B:
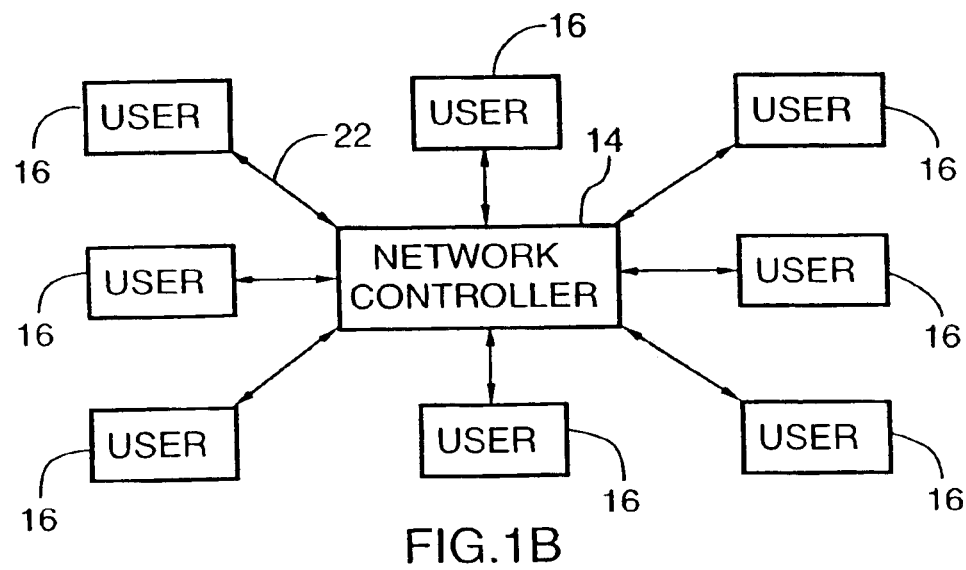
Figure 1C:
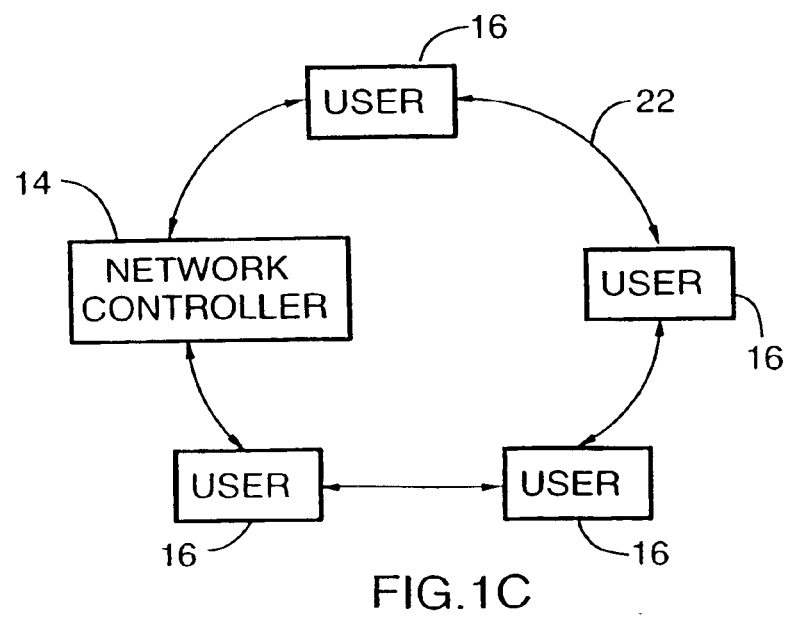

Alternate embodiments of the interrelation between users 16 and controller 14 are shown as a star/hub in FIG. 1B and in FIG. 1C a ring, and combinations, thereof Backbones, star/hubs, and rings are also possible to complete a networking environment for the flow and interchange of data as noted in FIG. 1 above.

Figure 2:
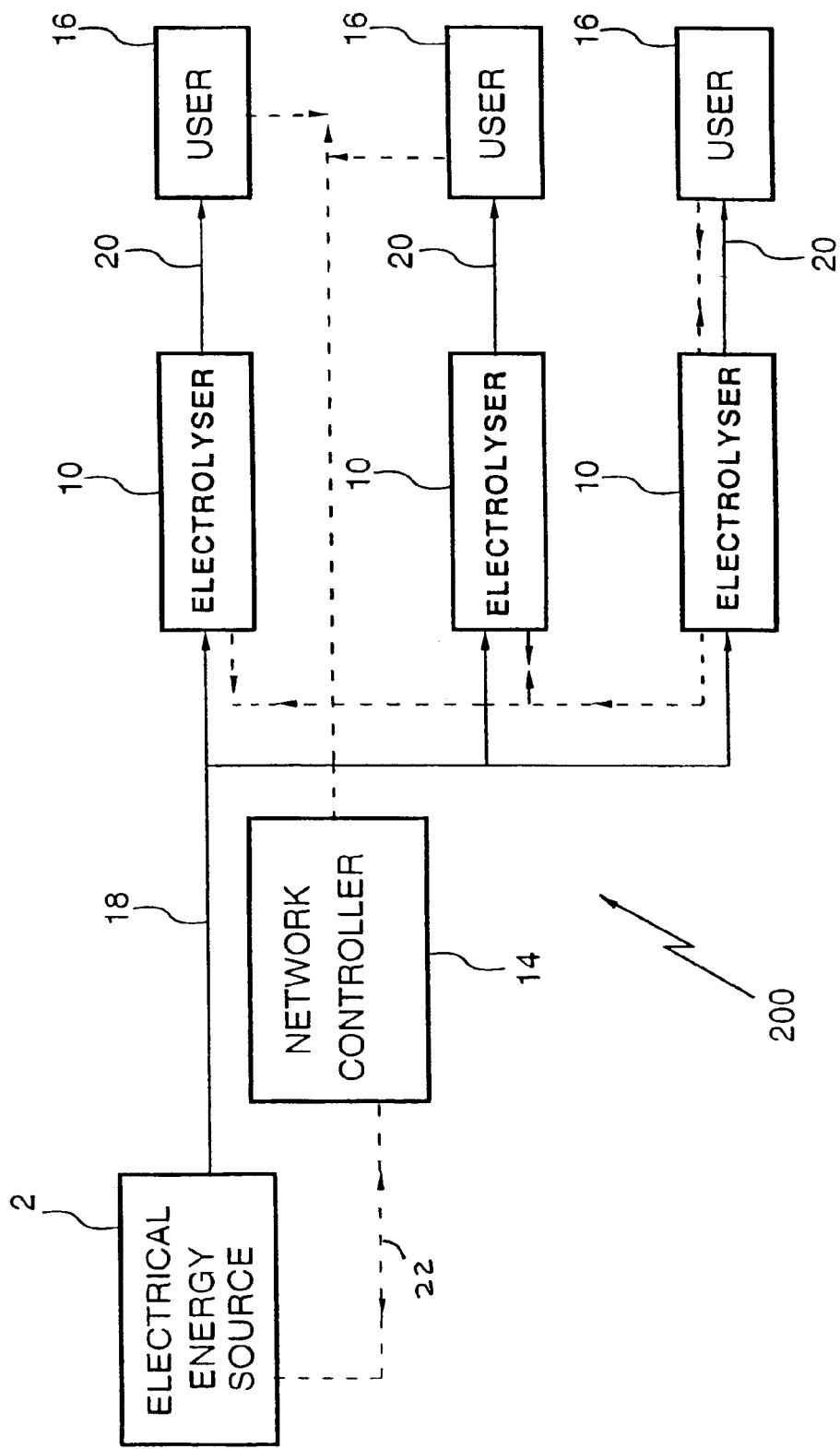
FIG. 2 is a block diagram of an alternative embodiment according to the invention.

With reference now to FIG. 2, in an analogous manner as herein described with reference to the embodiment of FIG. 1, users 16 define a demand for hydrogen, provided by a plurality of individual electrolysers 10 under the control of controller 14, from electrical energy source 2.

FIG. 2 thus shows generally as 200, an energy network according to the invention having a plurality of hydrogen fuel generating electrolysers 10 connected to corresponding user facilities, above or below ground or vehicle storage 16. Electrical energy is provided to cells 10 by lead 18 on demand, individually or collectively from power grid source 22 under the control of controller 14, and supplies hydrogen through conduits 20 to users 16. Control and supply controller 14 receives information from cells 10 and user facilities 16, as the fuel requirement and loading situation requires. Controller 14 further effects activation of the required electrical feed to cell 10 for hydrogen generation as required. The time of commencement, duration and electric power levels to a cell are also controlled by central controller 14. Information as to volume of hydrogen fuel container, hydrogen pressure therein and rate of pressure change on refurbishment are measured in real-time. Controller 14 further comprises data storage means from which information may be taken and read or added. Iteration and algorithmic treatment of real time and stored data can be made and appropriate process control can be realized by acting on such data in real time.

With reference to FIG. 2 in more detail, user 16 defines a demand for hydrogen and may transmit the demand by (i) use of a credit card, (ii) use of a smart card, (iii) use of a voice activation system, (iv) manual activation via front panel control, (v) use of an electronic, electric, or wireless infrared data transmission system to register a hydrogen demand on the network.

Upon receipt of the demand, network controller 14 determines the nature of the demand with respect to the quantity of hydrogen requested, the time to deliver the hydrogen, the conditions under which to deliver the hydrogen with respect to temperature, pressure, purity and the like, and the rate of delivery of hydrogen requested. Such initial definition of the hydrogen demand may be performed by a single controller 14 as illustrated in this embodiment or by a plurality of controllers 14 interconnected, for example, in a "hub/star", "backbone" or "ring" configuration in such a way as to permit intercommunication between all controllers 14.

Upon receipt of the demand, controller 14 determines the availability of electrical energy resources 2 to which it is interconnected with respect to the amount of energy available, the nature of the power available, in regard to current and voltage, the time availability of the energy, the type of electrical energy source available, the unit price per increment of electrical energy and compares this to the power required to generate the hydrogen demanded by users 16.

Controller 14 further determines the status of all hydrogen producing electrolyser source(s) 10 on the network. The initial checks include the current status of the hydrogen source, % use of rated capacity, rated capacity to produce hydrogen of a known quantity, for a known amount of electrical consumption. The initial checks further include monitoring of the process parameters for starting electrolyser(s) 10, and in particular, the temperature, pressure, anolyte and catholyte liquid levels, electrical bus continuity, KOH concentration and process valve and electrical switch status.

After controller 14 determines the initial status of electrolyser(s) 10, the hydrogen demand by users 16 and the nature and availability of the electrical sources on the network, controller 14 then initiates the starting sequence for electrolyser(s) 10 to meet the demands of users 16 subject to the availability of electrical energy resource(s) 2 at the lowest possible cost.

Controller 14 secures a quantity of electrical energy from the electrical source(s) 22 at the most preferred cost to user 16 to permit hydrogen to flow down conduits 20. Power is then applied to hydrogen producing electrolyser appliances 10 and the aforesaid process parameters monitored and controlled in such a fashion as to permit safe operation of hydrogen producing electrolyser appliances 10 for the generation of hydrogen supplied to users 16 along conduits 20. Oxygen may be, optionally, provided to users 20 or other users (not shown) by conduits (not shown).

Any incorrect noted status in any of the operational parameters noted above or in the quantity/purity of the product gases causes controller 14 to alter or interrupt the operation of electrolyser 10 until an appropriate status has been reached. Controller 14 also can modulate one or a plurality of electrolysers on the network to meet the demands of users 16 so as to successfully complete the hydrogen demand by providing the minimum quantity of hydrogen at the minimum rate of delivery over the minimum amount of time as specified at the minimum purity at the minimum cost to user 16.

Upon receiving notification from user 16 that their requirements have been successfully met, controller 14 instruct electrolyser(s) 10 to cease operation and informs electrical energy source(s) 2 of the revised change in electrical demand.

Figure 3:
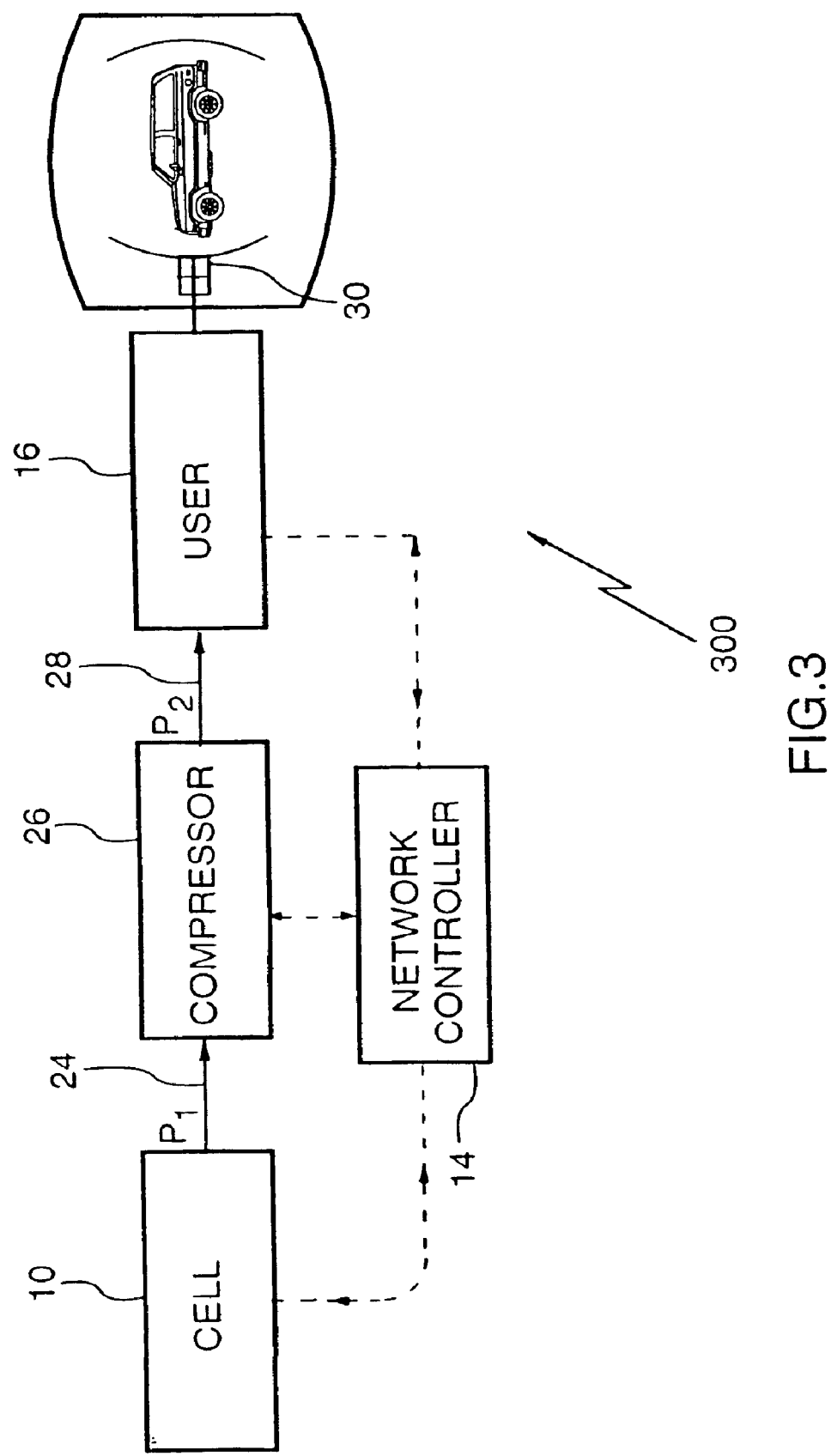
FIG. 3 is a block diagram showing the major features of a hydrogen fuel refurbishment system of use in the practice of a preferred embodiment of the invention.

With reference to FIG. 3, this shows a system according to the invention shown generally as 300 having an electrolyser cell 10 which produces source hydrogen at a desired pressure $P_1$ fed through conduit 24 to compressor 26. Compressor 24 feeds compressed outlet hydrogen through conduit 28 to user 16 at pressure $P_2$, exemplified as a vehicle attached by a fitting 30. Cell 10, compressor 26 and user 16 are linked to a controller 14.

Figure 4:
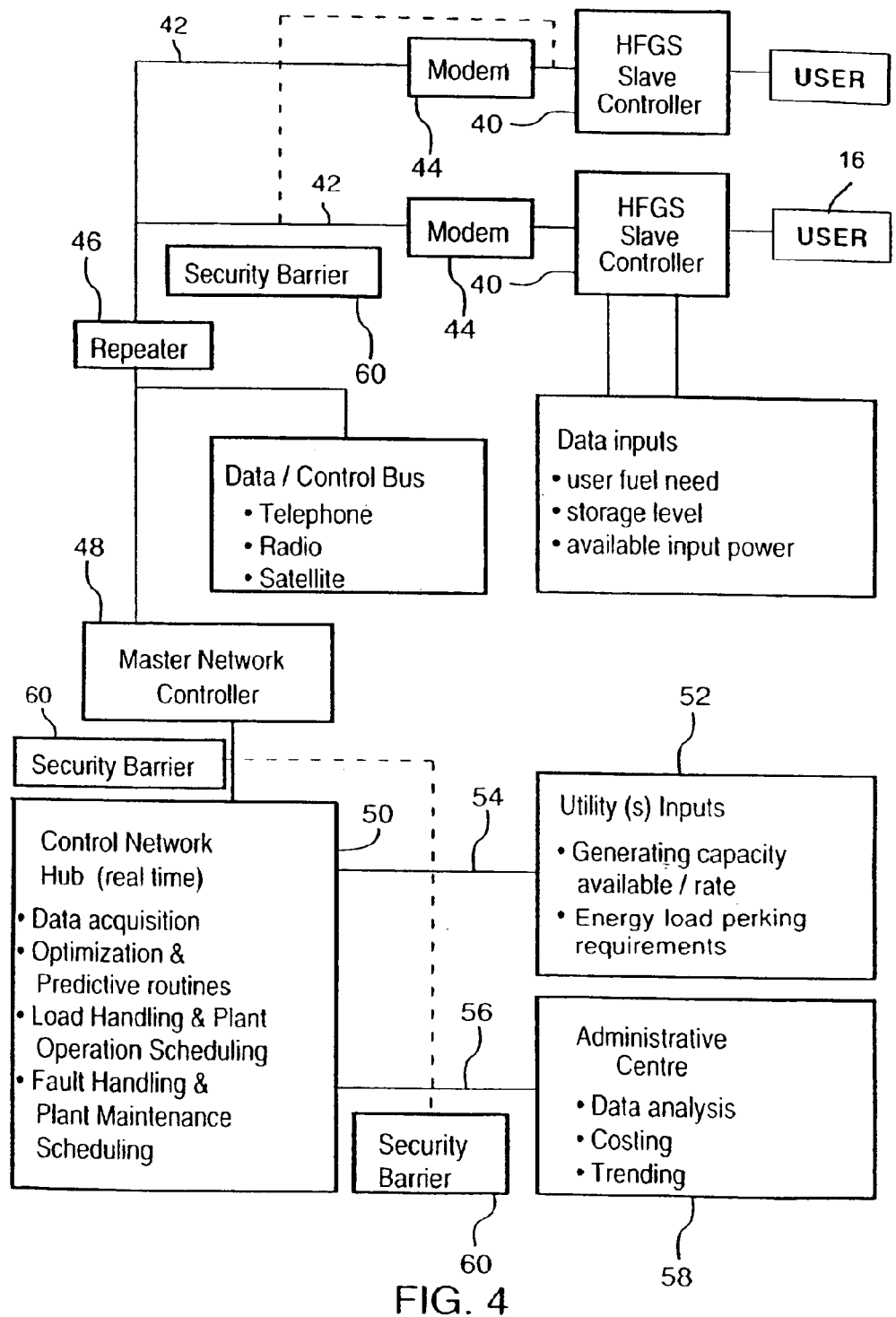
FIG. 4 is a logic block diagram of a control and supply data controller of one embodiment according to the invention.

With reference also now to FIG. 4, a pair of hydrogen fueller and generator, with or without storage, slave controllers (HFGS) 40, receives data input from users 16. This input may include at least one of user fuel needs, user fuel available, user storage facilities available, level of fuel available in any storage facility, available input power, type of input power, status and percent utilization of input power source. The HFGS controllers 40 verify the integrity of the data and transmit this data along conduits 42 via modems 44 and, if necessary, with the aid of repeater 46 to a master network controller 48. Data may also be transmitted in other embodiments, for example, via wireless transmission, via radio, infrared, satellite or optical means from HFGS slave controller 40 to master network controller 48 and onto control network hub 50.

In real time, or at some later time as desired by users 16, the status of the energy source 52 as to the type of power available, amount of power available, instantaneous and trend of power usage, instantaneous demand and predicted demand, nature and type of peak load demands and reserve capacity and percentage utilization of energy source assets can be transmitted in a similar fashion as described herein above along data conduit 54 to control network hub 50.

In real time, or at some later time as desired by users 16, control network hub 50 analyses the status and needs of the users via master network controller 48 and the status of energy sources 52 and provides an optimized algorithm to meet the needs of the users, while providing plant load shifting, plant operation scheduling, plant outage/maintenance, all at a documented minimal acceptable cost to the user. Energy sources 52 can access the status of the network and transmit data along data conduit 54 by means as described above to an administrative center 58 where data analysis of asset utilization, costing, and the like, can be performed and dynamically linked back to control network hub 50, which manages both users 16 demand and sources 52 supply in an optimized fashion. Security barrier 60 may be present at various locations in the network to ensure confidentiality and privileged data exchange flow to respective users 16, sources 52 and administrative centers 58 so as to maintain network security.

Figure 5:
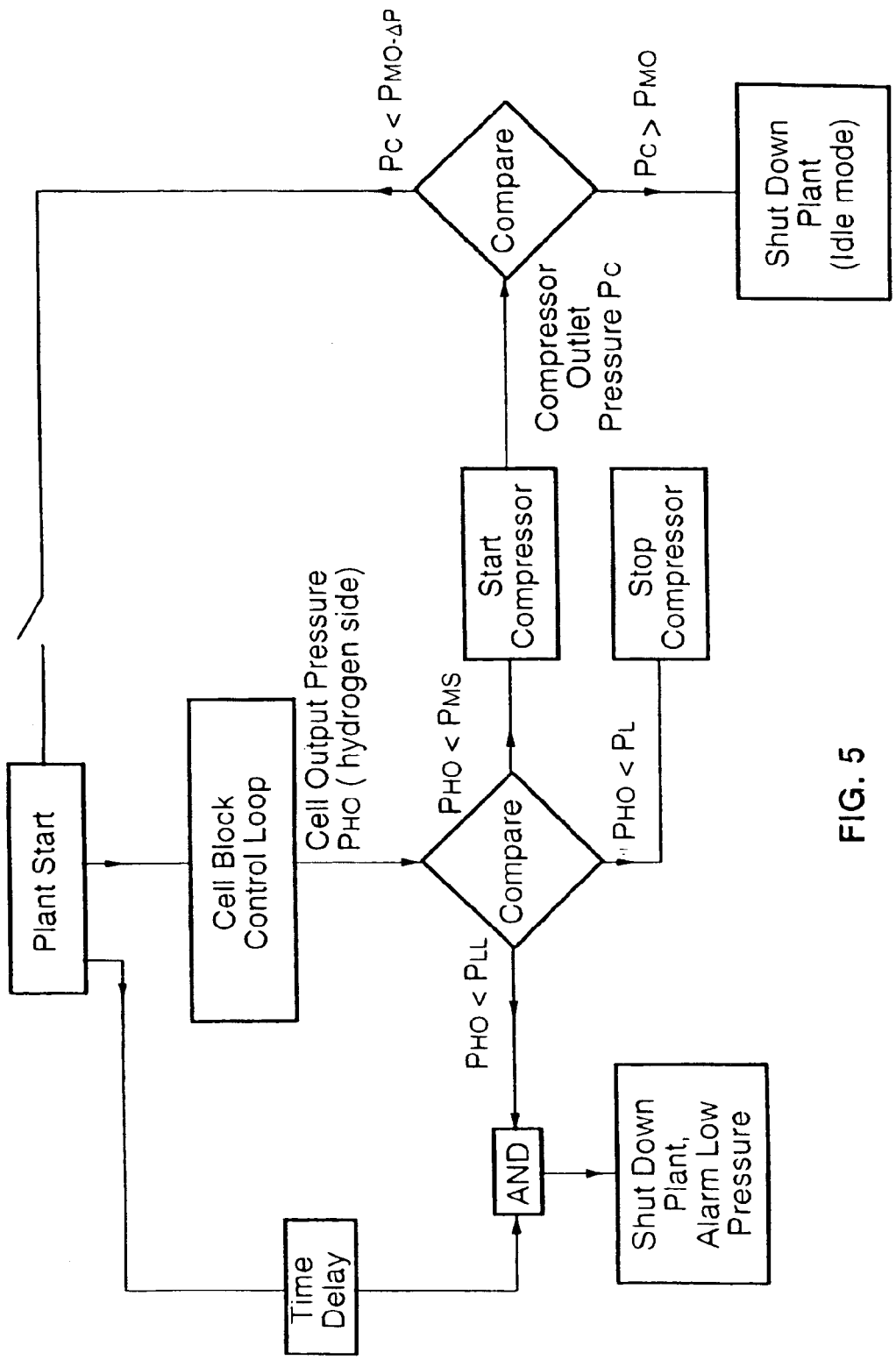
FIG. 5 is a logic block diagram of the control program of one embodiment of the system according to the invention.
Figure 6:
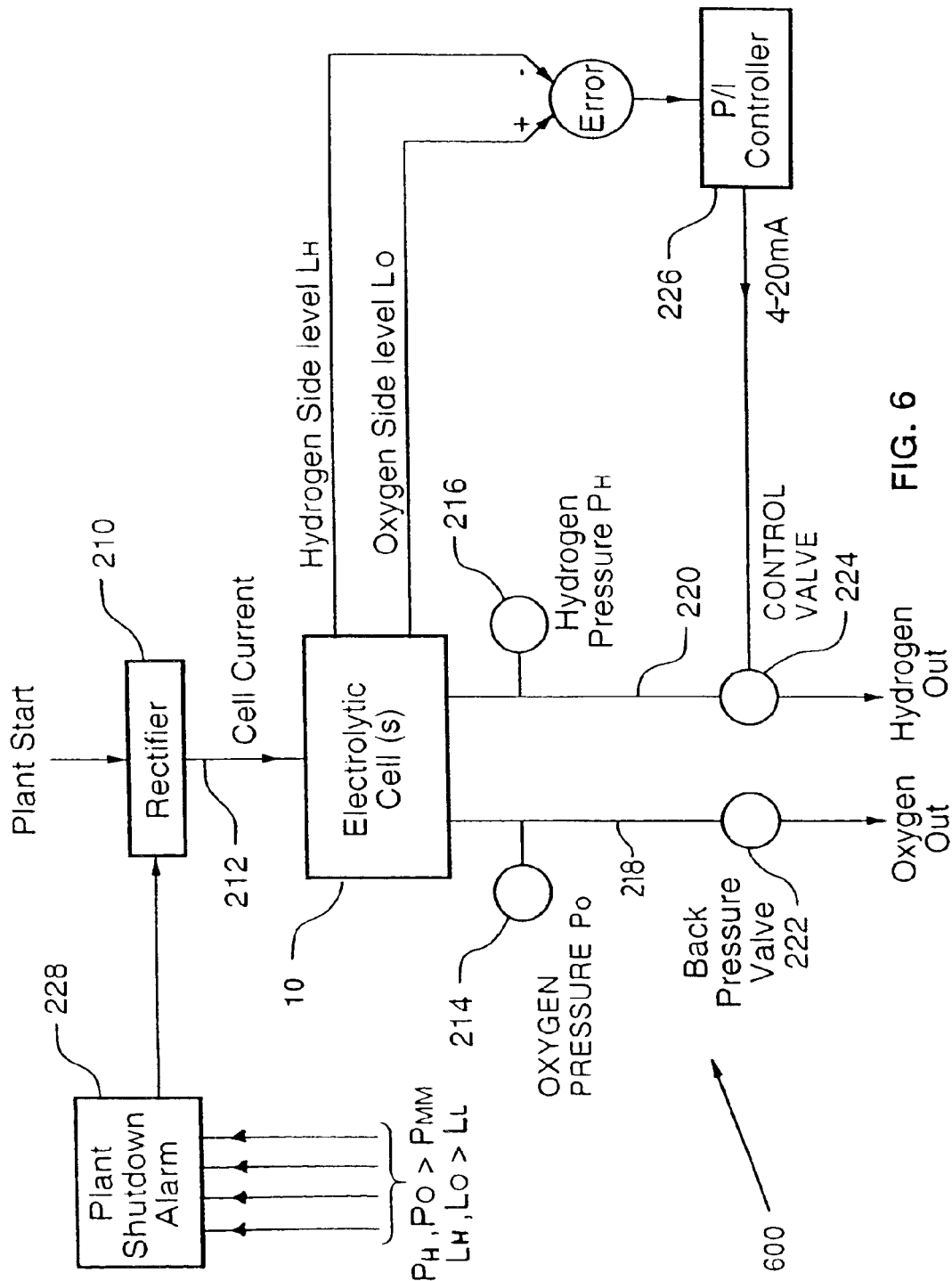
FIG. 6 is a logic block diagram of a cell block control loop of the control program of FIG. 5.

With reference to FIG. 5 this shows the logic control steps effective in the operation of the system as a whole, and in FIG. 6 the specific cell control loop, sub-unit wherein a logical block diagram of the control program of one embodiment of the system according to the invention; wherein $P_{MS}$—Compressor start pressure;
$P_L$—Compressor stop pressure;
$P_{LL}$—Inlet low pressure;
$P_{MO}$—Tank full pressure;
$\Delta P$—Pressure switch dead band;
$P_{MM}$—Maximum allowable cell pressure; and
$L_L$—Minimum allowable cell liquid level.

In more detail, FIG. 5 shows the logic flow diagram of the control program for the operation. Upon plant start-up, cell 10 generates hydrogen gas at some output pressure, $P_{HO}$. The magnitude of such pressure, $P_{HO}$, is used to modulate the operation of a start compressor. If $P_{HO}$ is less than some minimum pressure related to the liquid level in 10, $P_{LL}$, a low pressure alarm is generated and a plant shutdown sequence is followed. If the output pressure, $P_{HO}$, is greater than $P_{LL}$, then a further comparison is made. If the output pressure, $P_{HO}$, is greater than $P_{MS}$, the minimum input pressure to the start compressor, the latter begins a start sequence. If the output pressure is less than some minimum value, $P_L$, then start compressor remains at idle (stopped) until such time as the magnitude of $P_{HO}$ exceeds $P_{MS}$ to begin compressor operation.

Upon starting the compressor, the hydrogen gas is compressed in one or more stages to reach an output pressure, $P_C$, from the exit of the compressor. If the output pressure, $P_C$, exceeds a safety threshold, $P_{MO}$, then operation of the compressor is terminated. If the output, $P_C$, is less than some desired minimum, $P_{MO}-\Delta P$, the compressor runs to supply and discharge hydrogen.

FIG. 6 comprises a block diagram of the hydrogen fuel replenishment apparatus shown generally as 600 used to supply hydrogen and/or oxygen gas at a minimum desired pressure. Apparatus 600 includes a rectifier 210 to convert an a.c. signal input to a desired d.c. signal output, a bus bar 212, electrolytic cell(s) 10, means of measuring oxygen 214 and hydrogen 216 pressure in conduits 218 and 220, respectively, valve means for controlling the flow of oxygen 222 and hydrogen 224, respectively, and a process/instrument controller 226 to ensure desired operation of electrolytic cell(s) 10 with suitable plant shutdown alarms 228.

FIG. 6 also comprises a process flow diagram for the cell block of FIG. 5. Upon plant start-up, rectifier 210 establishes a safe condition by examining the status of plant alarm 228 with respect to pressure and level controls. If the alarm indicates a safe status, current and voltage (power) are transmitted along cell bus bar 212 from rectifier 210 to electrolytic cell 10. With the application of a suitable current/voltage source, electrolysis takes place within electrolytic cell(s) 10 with the resultant decomposition of water into the products of hydrogen gas and oxygen gas. The oxygen gas is transported along conduit 218 in which oxygen pressure means 214 monitors oxygen pressure, $P_O$, at any time, and to control oxygen pressure via modulation of back pressure valve 222. Similarly, the hydrogen gas is transported along conduit 220 in which means 216 monitors hydrogen pressure, $P_H$, at any time, and to control hydrogen pressure via control valve 224. In the operation of electrolytic cell(s) 10, the anolyte level of the cell on the oxygen side, $L_O$, and the catholyte level on the hydrogen side, $L_H$, are detected via P/I controller 226 to provide a control signal to valve 224 to facilitate the supply of hydrogen and/or oxygen gas at some desired pressure.

Figure 7A:
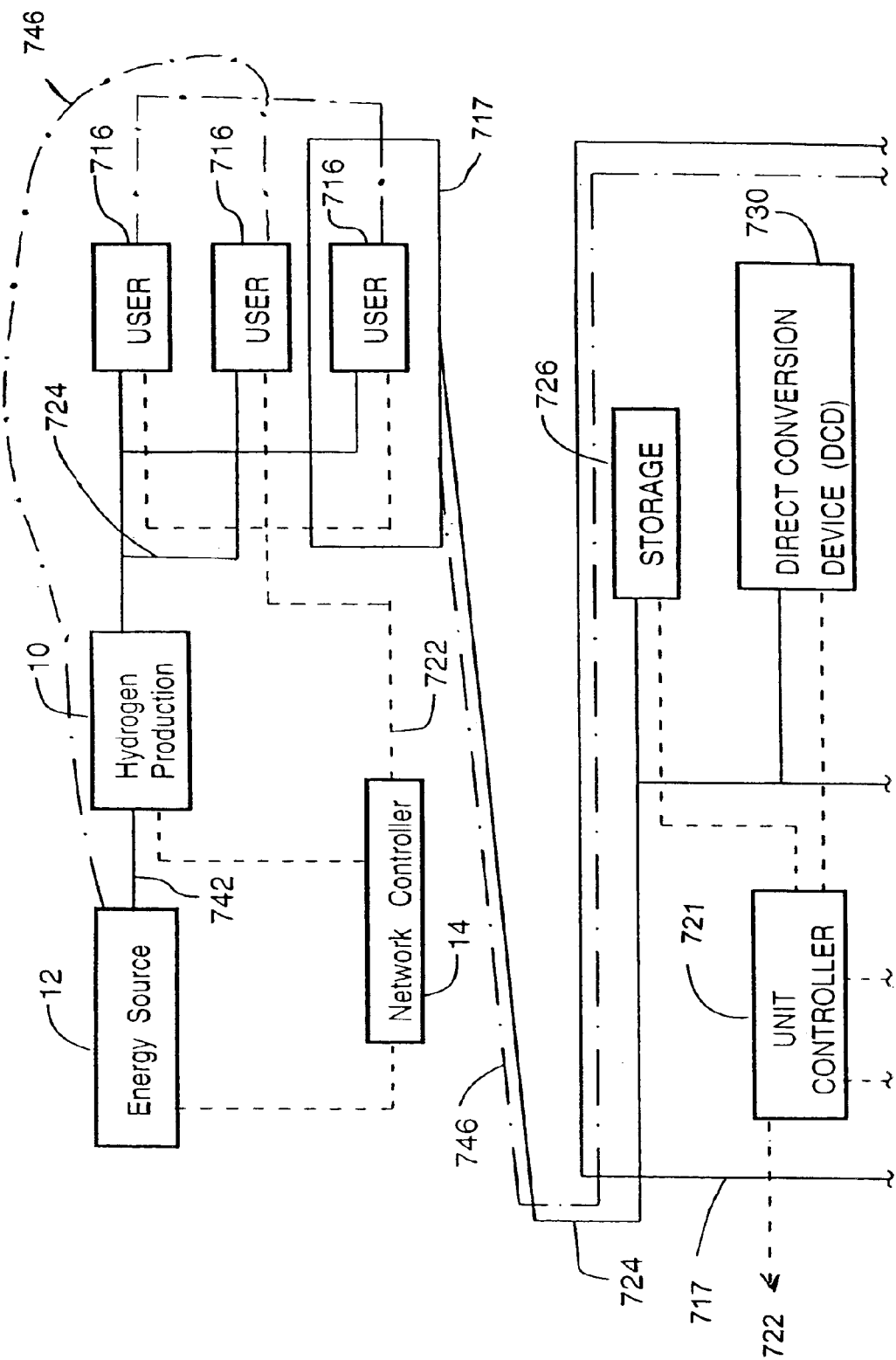
FIGS. 7a, 7b, when combined, is a schematic block diagram of an embodiment of the invention representing interrelationships between the embodiment of FIG. 1 and a further defined user network; and wherein the same numerals denote like parts.
Figure 7B:
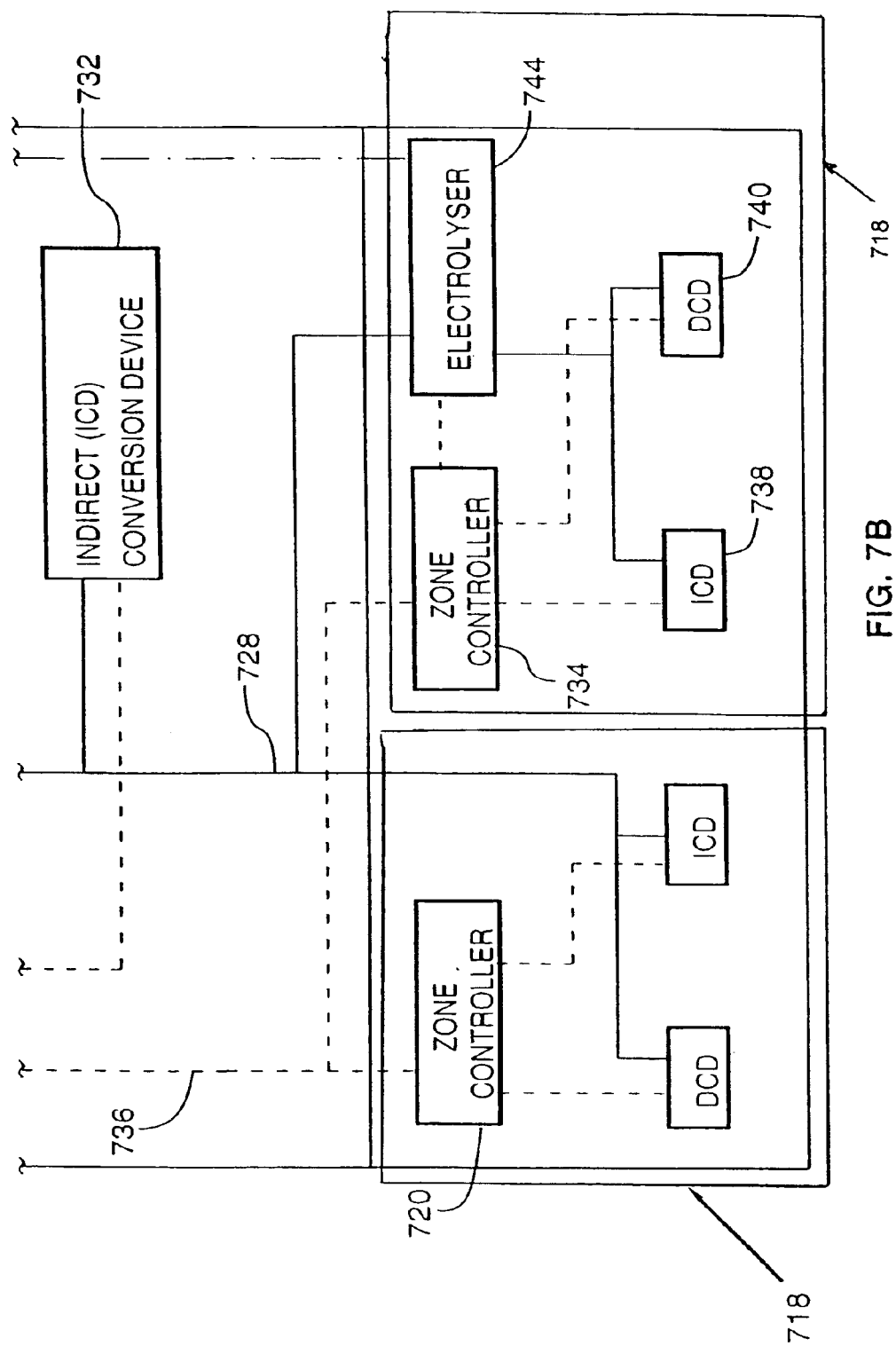

With reference now to FIG. 7 users 716 include a building unit 717, having at least one geographic zone 718, whose tenancy may be residential, as in an apartment, semi-attached, detached dwelling, and the like, or industrial/commercial, as in an office, plant, mall, factory, warehouse, and the like, and which defines a demand for hydrogen. Such user 716 may transmit its demand by (i) use of a credit card, (ii) use of a smart card, or (iii) use of an electronic, electric, or wireless data transmission, to register a hydrogen demand within zone 718 to a zone controller 720 exemplifying zone data control and supply means.

Upon receipt of the demand, zone controller 720 determines the nature of the demand with respect to the quantity of hydrogen requested, the time to deliver the hydrogen, the conditions under which to deliver the hydrogen with respect to temperature, pressure, purity and the like, the end utilization purpose of the hydrogen, and the rate of delivery of the hydrogen requested. Such initial definition of this hydrogen demand may be performed by a single or a plurality of zone controller(s) 720 interconnected in a network configured as a "hub", "star", "ring" or "backbone" as exemplified in FIGS. 1A–1C, in such a way as to permit intercommunication between all controllers 720 to a unit controller 721 for the unit 717 exemplifying a building data and control supply means via bus 722.

Upon receipt of the demand by unit controller 721 from the network of zone controllers 720, unit controller 721 determines the availability of all energy resources 12 available to building unit 717 by polling the status from a network controller 14 to which it is interconnected with respect to the amount of energy available, the nature of the power available, the time availability of the energy, the type of energy source available, the unit price per increment of energy and compares this to the energy required to generate the energy, the type of energy source available, the unit price per increment of energy and compares this to the energy required to generate the hydrogen demanded by unit 717 and subsequent zones 718.

Upon receipt of the demand, network controller 14 further determines the status of all hydrogen producing sources 10 on the network. Initial checks include the current status of the hydrogen source, percentage use of rated capacity, rated capacity to produce hydrogen of a known quantity for a know amount of energy consumption and monitoring of the process parameters for starting the hydrogen production source(s), process valves and electrical switch status. Network controller 14 then initiates the starting sequence for hydrogen producing source(s) 10 to meet the demands of unit 717 and subsequent zones 718 subject to the availability of energy resource(s) 12 at the lowest possible cost.

Network controller 14 secures a quantity of energy from energy source(s) 12 at the most preferred cost to unit 717 and updates unit controller 721 and zone controller 720 to permit hydrogen to flow through conduits 724. Energy is then consumed from energy source 12 to produce hydrogen via hydrogen production source(s) 10 for the generation of hydrogen and oxygen gases which are supplied to the unit 717 through zones 718.

Hydrogen flowing in conduit 724 to unit 717 is monitored by unit controller 721 which further controls the distribution of hydrogen within unit 717. Hydrogen may flow so as to enter storage unit 726 for later use by a zone 718, and may flow along conduit 728 to a direct conversion device 730 for conversion of hydrogen into electricity via a fuel cell and the like (not shown) for a further central distribution within unit 717. It may further be converted into heat and/or electricity by an indirect conversion device 732, such as a boiler, furnace, steam generator, turbine and the like for further central distribution within unit 717 and may be further passed along conduit 728 directly to a zone 718.

Hydrogen flowing in conduit 728 to zone 718 is further monitored by unit controller 721, zone controller 720 and zone controller 734 along data bus 736 which further controls the distribution of hydrogen within zone 718. Hydrogen within the zone may flow so as to enter a direct 738 or indirect 740 conversion device within zone 718 for conversion into electricity or heat via a furnace, stove and the like (not shown).

In a further embodiment, network controller 14 selects a specific type of energy source 12 to buy electricity which can be transmitted along conduits 746, so as to arrive directly at zone 718 where conversion into hydrogen occurs within the zone by means of an electrolyser 744 for generation of hydrogen within the geographic domains of zone 718 for use by direct 738 or indirect 740 conversion devices as noted above, all under the direction of zone controller 720 or 734.

Any incorrect noted status in any of the operational parameters noted above or in the quality/purity of the product gases, will result in network controller 14, unit controller 721 and zone controller 720 to alter or intercept the operation of hydrogen source(s) 10 and 744, along with hydrogen conversion devices 730, 732, 738, 740 until an appropriate status has been reached. Controllers 14, 720, 721 and 734 also can act to modulate one or a plurality of hydrogen producing sources on the network to meet the demands of unit 717 and zones unit 717 and zones, 718 so as to successfully complete the hydrogen demand of users 716, 716 to provide the minimum quantity of hydrogen at the minimum rate of delivery over the minimum amount of time as specified at the minimum purity at the minimum cost to users 716, 718, and optionally, schedules hydrogen demand.

Upon receiving notification from unit 717 and zones, 718 that their requirements have been successfully met, controllers 14, 721 and 720 instruct hydrogen producing sources 10, 744 to cease operation and informs energy sources 12 of the revised change in energy demand and, optionally, schedules hydrogen demand.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A hydrogen energy system for one or more buildings, said system comprising:
   (a) a hydrogen generator;
   (b) at least one zone controller for receiving and processing demands from at least one hydrogen user associated with at least one zone of the one or more buildings;
   (c) a unit controller for receiving and processing hydrogen demand data received from said at least one zone controller.

2. A system as claimed in claim 1 wherein said hydrogen demand data includes the quantity of hydrogen demanded.

3. A system as claimed in claim 1 wherein said hydrogen demand data includes hydrogen delivery time.

4. A system as claimed in claim 1 wherein said hydrogen demand data includes hydrogen purity requirements.

5. A system as claimed in claim 1 wherein said hydrogen demand data includes hydrogen pressure requirements.

6. A system as claimed in claim 1 wherein said hydrogen demand data includes hydrogen temperature requirements.

7. A system as claimed in claim 1 wherein said hydrogen demand data includes the intended end use of the hydrogen.

8. A system as claimed in claim 1 wherein said hydrogen demand data includes the desired rate of delivery of the hydrogen.

9. A system as claimed in claim 1, wherein said unit controller controls the generation of hydrogen by said hydrogen generator.

10. A system as claimed in claim 1, wherein said unit controller controls the supply of hydrogen to said at least one hydrogen user.

11. A system as claimed in claim 1, wherein said unit controller controls the generation of hydrogen by said hydrogen generator and the supply of hydrogen to said at least one hydrogen user.

12. A system as claimed in claim 1 wherein at least one of said hydrogen users comprises a device for converting hydrogen into electricity.

13. A system as claimed in claim 12 wherein said electricity conversion device is a hydrogen powered internal combustion engine.

14. A system as claimed in claim 12 wherein said electricity conversion device is a fuel cell.

15. A system as claimed in claim 12 wherein said electricity conversion device is adapted to deliver energy to an electricity grid.

16. A system as claimed in claim 1 wherein at least one of said hydrogen users comprises a device for converting hydrogen into thermal energy.

17. A system as claimed in claim 16 wherein said thermal energy conversion device is a boiler.

18. A system as claimed in claim 16 wherein said thermal energy conversion device is a furnace.

19. A system as claimed in claim 1 further comprising a compressor for compressing hydrogen generated by said hydrogen generator to a minimum desired pressure.

20. A system as claimed in claim 1 wherein said hydrogen generator generates hydrogen at a minimum desired pressure.

21. A system as claimed in claim 1 wherein a plurality of said zone controllers receive and process demands from a plurality of said hydrogen users and communicate said demands to said unit controller.

22. A system as claimed in claim 1 wherein a plurality of said zone controllers receive and process demands for a plurality of said zones of the one or more buildings and communicate said demands to said unit controller.

23. A system as claimed in claim 1 wherein said system provides hydrogen to a plurality of buildings.

24. A system as claimed in claim 23 wherein each of said buildings includes one of said unit controllers, at least one of said zone controllers and at least one hydrogen user.

25. A system as claimed in claim 24 further comprising a building network controller for receiving and processing hydrogen demand data from said unit controllers for each of said buildings.

26. A system as claimed in claim 25 wherein said hydrogen generator generates hydrogen for a plurality of said buildings.

27. A system as claimed in claim 26 wherein said building network controller controls the generation of hydrogen by said hydrogen generator and the supply of hydrogen to said at least one hydrogen user for a plurality of said buildings.

28. A system as claimed in claim 26 wherein said building network controller receives and processes said energy source data in order to control the generation, storage and supply of hydrogen to meet the demands of said hydrogen users for a plurality of said buildings.

29. A system as claimed in claim 25 wherein said building network controller is in communication with an energy network controller that controls a network of energy sources each having energy source data associated therewith.

30. A system as claimed in claim 29 wherein said at least one hydrogen user comprises a device for converting hydrogen into electricity and wherein said electricity conversion device comprises one of said energy sources.

31. A system as claimed in claim 30 wherein said building network controller controls the generation and supply of electricity by said electricity conversion device.

32. A system as claimed in claim 1 wherein said unit controller is in communication with an energy network controller that controls a network of energy sources each having energy source data associated therewith.

33. A system as claimed in claim 32 wherein said unit controller receives and processes said energy source data in order to control the generation, storage and supply of hydrogen to meet the demands of said hydrogen users.

34. A system as claimed in claim 32 wherein said at least one hydrogen user comprises a device for converting hydrogen into electricity and wherein said electricity conversion device comprises one of said energy sources.

35. A system as claimed in claim 34 wherein said unit controller controls the generation and supply of electricity by said electricity conversion device.

36. A system as claimed in claim 1 wherein said hydrogen generator is disposed remotely from said building.

37. A system as claimed in claim 1 wherein said hydrogen generator is disposed proximate to said building.

38. A system as claimed in claim 1 wherein said hydrogen generator is disposed within said building.

39. A system as claimed in claim 1 further comprising a hydrogen storage apparatus for storing hydrogen received from said hydrogen generator for use by said at least one hydrogen user.

40. A system as claimed in claim 39 wherein said hydrogen storage apparatus comprises at least one hydride storage chamber.

41. A system as claimed in claim 39 wherein said hydrogen storage apparatus comprises at least one container for storing pressurized hydrogen.

42. A system as claimed in claim 1 further comprising a hydrogen delivery system for delivering hydrogen to at least one of said hydrogen users.

43. A system as claimed in claim 42 wherein at least one of said hydrogen users comprises a hydrogen powered vehicle.

44. A system as claimed in claim 1 wherein said at least one zone controller includes a user activation interface for receiving data concerning a demand for hydrogen.

* * * * *